United States Patent [19]
Watanabe et al.

[11] Patent Number: 5,345,290
[45] Date of Patent: Sep. 6, 1994

[54] LENS POSITION CONTROLLER WITH LENS MOVEMENT DIRECTION DETECTION

[75] Inventors: Takashi Watanabe, Tokyo; Naoya Kaneda, Kanagawa, both of Japan

[73] Assignee: Canon Kabushiki Kaisha, Tokyo, Japan

[21] Appl. No.: 997,073

[22] Filed: Dec. 29, 1992

[30] Foreign Application Priority Data

Jan. 7, 1992 [JP] Japan .................................. 4-000809
Nov. 30, 1992 [JP] Japan .................................. 4-345549

[51] Int. Cl.5 ........................... G03B 13/36; G03B 7/09
[52] U.S. Cl. ...................................... 354/400; 359/823
[58] Field of Search ..................... 354/400, 402, 195.1, 354/195.12, 195.13; 358/227; 359/823, 824

[56] References Cited
U.S. PATENT DOCUMENTS 5,036,348 7/1991 Kusaka ................................. 354/402
5,077,571 12/1991 Takayama et al. .................. 354/400
5,204,715 4/1993 Nakanishi et al. ......... 354/195.13 X

*Primary Examiner*—W. B. Perkey
*Attorney, Agent, or Firm*—Robin, Blecker, Daley & Driscoll

[57] ABSTRACT

An optical apparatus arranged to move a lens by using a stepping motor as a driving source, includes detecting mechanisms disposed at a plurality of positions for detecting a plurality of reference positions of the lens, respectively, and a position detecting circuit for finding an absolute position of the lens on the basis of the number of driving steps of the stepping motor relative to each of the plurality of reference positions.

24 Claims, 12 Drawing Sheets

LENS POSITION CONTROLLER WITH LENS MOVEMENT DIRECTION DETECTION

BACKGROUND OF THE INVENTION

1. Field of the Invention

The present invention relates to an optical apparatus provided with detecting means for detecting a position of a moving lens which serves a function such as focusing or zooming.

2. Description of the Related Art

In an optical apparatus, such as a silver-halide camera or a video camera, in which a focusing lens is driven by means of a stepping motor, the position of the focusing lens has conventionally been controlled under open-loop control on the basis of the number of driving steps of the stepping motor. In such a conventional example, it is necessary to detect an absolute position of the focusing lens which is used as a reference position when the apparatus is started up, as by turning on a power source. In general, a detecting device for detecting the absolute position of the focusing lens is arranged in such a manner that a detecting mechanism of a non-contact type, such as a photosensor, or that of a contact type, such as a leaf switch, is provided in one position within the moving stroke of the focusing lens. Detection of the absolute position of the focusing lens is performed in such a way that the focusing lens directly turns on and off the photosensor or the leaf switch.

However, the conventional example has a number of disadvantages. For example, if the time required to detect the absolute position which serves as the reference position of the focusing lens is to be minimized, wherever in the moving stroke the focusing lens is currently located, it is desirable to set the absolute position, which serves as the reference position, in the middle position of the moving stroke of the focusing lens. However, the longer the moving stroke of the focusing lens, the longer the time required to detect the absolute position which serves as the reference position.

If the above-described conventional example is applied to the construction of a lens barrel made of a plastics material, the following problem is encountered. In general, plastic lens barrels tend to expand or shrink due to a temperature variation. In the conventional example in which the absolute position which serves as the reference position of the focusing lens is provided at only one position, even if such a plastic lens barrel expands or shrinks due to a temperature variation during an operation of the stepping motor, it is impossible to detect whether a variation has occurred in the state of focus.

In a conventional optical apparatus, a front-lens-group focusing type of lens has generally been adopted in which a first lens group is moved by a helicoid along its optical axis. However, a recent type of optical apparatus utilizes a so-called, inner- or rear-focus type of zoom lens in which a lens group located rearward of a variator lens which serves a magnification-varying lens group is used to perform focusing.

With the inner- or rear-focus type of zoom lens, it is possible to photograph a subject at a closer distance than the front-lens-group focusing type of lens. Further, the inner- or rear-focus type of zoom lens can be easily constructed so that focusing can be continuously performed between infinity and a position immediately before the front surface of the zoom lens, particularly, on the wide-angle side. Various lens types are known in the field of such an inner- or rear-focus type of zoom lens. For the purpose of illustration, FIG. 11 shows one construction example in which a lens group located at its rear end is used for focusing.

The construction example shown in FIG. 11 includes a front lens 101 which is fixed, a variator lens 102, a fixed lens 103 and a focusing lens 104 (which also serves as a compensator). The shown construction example also includes a guide bar 133 for guiding the variator lens 102 while inhibiting rotation thereof, a feed bar 134 for the variator lens 102, a fixed lens barrel 135, iris unit 136 (which, in the shown example, is inserted perpendicularly to the surface of the sheet of FIG. 11), and a stepping motor 137 which serves as a focusing motor. The stepping motor 137 has an output shaft 138 which is externally threaded to move the focusing lens 104. An internally threaded part 139 is meshed with an externally threaded part of the output shaft 138, and is integral with a moving frame 140 of the focusing lens 104.

The shown construction example also includes guide bars 141 and 142 for the moving frame 140 of the focusing lens 104, a rear plate 153 for positioning and retaining the guide bars 141 and 142, a relay holder 144, a zoom monitor 145, a speed reducing unit 146 for the zoom motor 145, a gear 147 fixed to an output shaft 146a of the speed reducing unit 146, and a gear 148 fixed to the feed bar 134 for the variator lens 102 and meshed with the gear 147.

An image sensor 170 is used for the purposes of sensing an image, measuring the luminance thereof, and detecting focus. A microcomputer 171 controls the driving of each of the motors 137 and 145, an autofocus operation based on an output from the image sensor 170, and various other operations.

In the above-described construction, if the stepping motor 137 is driven, the focusing lens 104 is driven to move along the optical axis by the output shaft 138. If the zoom motor 145 is driven, the feed bar 134 is rotated through the gears 147 and 148, thereby moving the variator lens 102 along the optical axis.

FIG. 12 shows the positional relation between the variator lens 102 and the focusing lens 104 in the above-described inner-focus type of zoom lens with respect to each subject distance, and the respective positions of the variator lens 102 and the focusing lens 104 are plotted along the horizontal axis and the vertical axis.

Loci 150 to 153 correspond to, for example, the respective subject distances shown in Table 1.

TABLE 1

| LOCUS | SUBJECT DISTANCE |
| --- | --- |
| 150 | ∞ |
| 151 | 2 m |
| 152 | 1 m |
| 153 | Immediately Before Lens |

The variator lens 102 and the focusing lens 104 are inhibited from assuming a positional relation which corresponds to any point in each of hatched regions 154 and 155 in FIG. 12.

As shown in FIG. 12, the inner-focus type of zoom lens has a variable-focus-like relation, i.e., a relation in which the position at which its focusing lens is to be located with respect to the position of its variator lens varies for each subject distance.

In the field of such a zoom lens, a number of methods have been proposed for controlling the positional relation between the variator lens and the focusing lens during zooming (for example, U.S. Pat. No. 5,027,147). Although detailed description of the methods is omitted herein, they have the following common arrangement. Absolute-position encoders or the like are respectively provided for detecting the absolute position of the variator lens and that of the focusing lens. The position at which the focusing lens is to be located with respect to the position of the variator lens during zooming and the speed at which the focusing lens is to be moved with respect to such position during zooming are determined from position information about each of the variator lens and the focusing lens and map information, such as that shown in FIG. 12, which is separately memorized in a microcomputer.

To detect the respective positions of the variator lens and the focusing lens, a number of methods are available. For example, it is possible to adopt a method which utilizes an arrangement employing a variable resistor. Otherwise, it is also possible to adopt a method which utilizes an arrangement employing a stepping motor as an actuator. In the case of the latter method, a method of continuously counting the number of pulses inputted to the stepping motor (the number of driving steps) may also be used.

According to any of these detecting methods, when an electric power source is turned on, the variator lens and the focusing lens are made to move to their respective predetermined reference positions and pulse counting is started at each of the reference positions, whereby the respective absolution positions of the variator lens and the focusing lens can be detected.

SUMMARY OF THE INVENTION

It is, therefore, a primary object of the present invention to provide an optical apparatus in which a lens is moved by using a stepping motor as a driving source and which is capable of solve the above-described problems.

To achieve the above object, in accordance with one aspect of the present invention, there is provided an optical apparatus in which detecting mechanisms for detecting individual reference positions of the lens are respectively provided at a plurality of positions and which is provided with detecting means for detecting an absolute position of the lens on the basis of the number of driving steps of the stepping motor counted from each of the reference positions.

In accordance with another aspect of the present invention, there is provided an optical apparatus which is capable of reducing the time required to enable photography, by simultaneously executing automatic focusing during the time when detection of a reference position of a lens is being executed.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

A first embodiment of the present invention will be described below with reference to FIG. 1. In the following description of the first embodiment, reference will be made to an example in which the range of movement of a focusing lens is divided into three zones.

Figure 1:
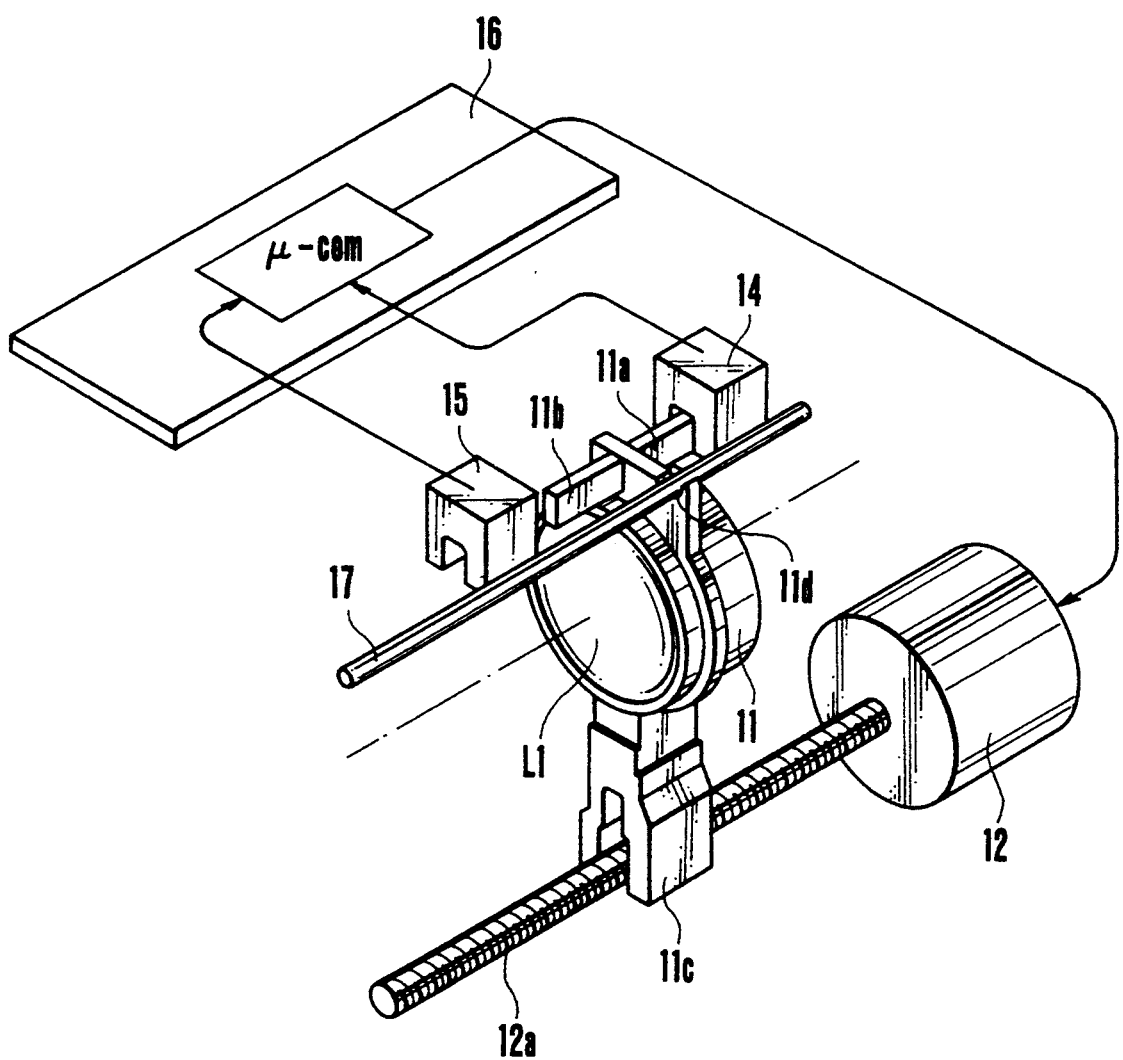
FIG. 1 is a schematic perspective view of a lens moving mechanism according to a first embodiment of the present invention.

The arrangement shown in FIG. 1 includes a lens holding tube 11 for holding a focusing lens L1, and light blocking plates 11a and 11b which serve as operating members to turn on or off photosensors 14 and 15, respectively. The lens holding tube 11 has a rack 11c engaged with a feed screw 12a. The rack 11c is meshed with the feed screw 12a which extends from a stepping motor 12 which serves as an actuator, and the lens holding tube 11 is guided along a guide bar 17 by means of a U-shaped groove 11d so that the lens holding tube 11 can move along only the optical axis of the focusing lens L1 with its rotation being inhibited. Accordingly, if the stepping motor 12 is driven to rotate the feed screw 12a, the lens holding tube 11, which serves a focusing function, is driven to move along the optical axis, thereby causing the focusing lens L1 to perform a focusing operation. The respective photosensors 14 and 15 are provided for detecting corresponding reference positions of the focusing lens L1, and are arranged to detect whether the focusing lens L1 has reached either of the reference positions, according to whether the light blocking plate 11a or 11b has moved into the corresponding one of the photosensors 14 and 15 to block the light thereof. A printed circuit board 16 is provided with circuit means which includes a microcomputer μ-com for controlling the stepping motor 12 and the photosensors 14 and 15 and for detecting an absolute position of the focusing lens L1.

Figure 2:
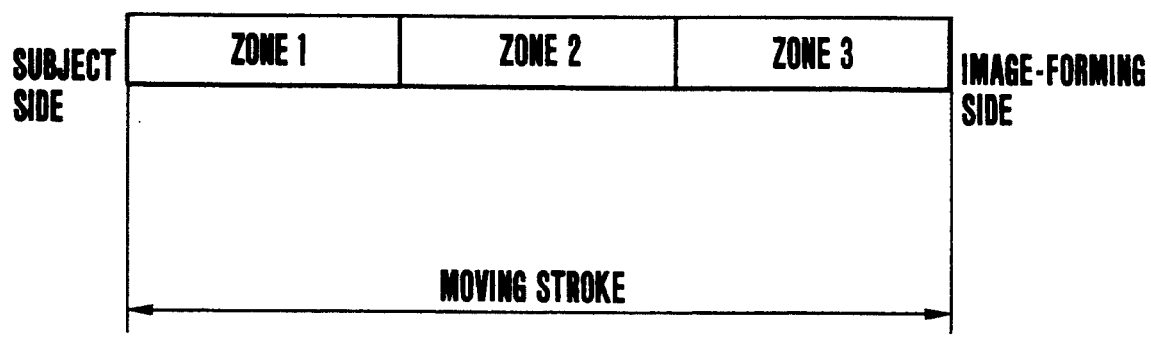
FIG. 2 is an explanatory view showing zones into which a moving stroke of the focusing lens of FIG. 1 is divided.

FIG. 2 shows zones into which the moving stroke of the focusing lens L1 is divided according to the first embodiment. As shown, according to the first embodiment, the moving stroke is divided into three zones by using the above-described photosensors 14 and 15.

Figure 3:
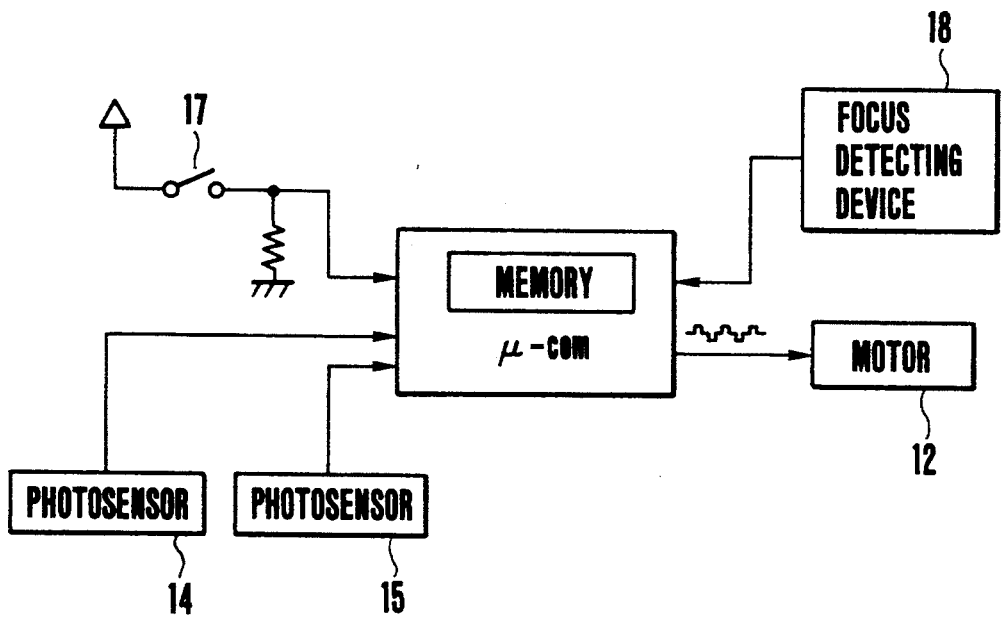
FIG. 3 is a circuit diagram of the first embodiment.

FIG. 3 shows a control circuit according to the first embodiment, and the microcomputer μ-com receives an output from each of the two photosensors 14 and 15, a power source switch 17 and a focus detecting device 18, and the driving of the stepping motor 12 (i.e., whether the direction of motor rotation is forward or backward) is controlled by program control on the basis of information inputted to the microcomputer μ-com.

Figure 4:
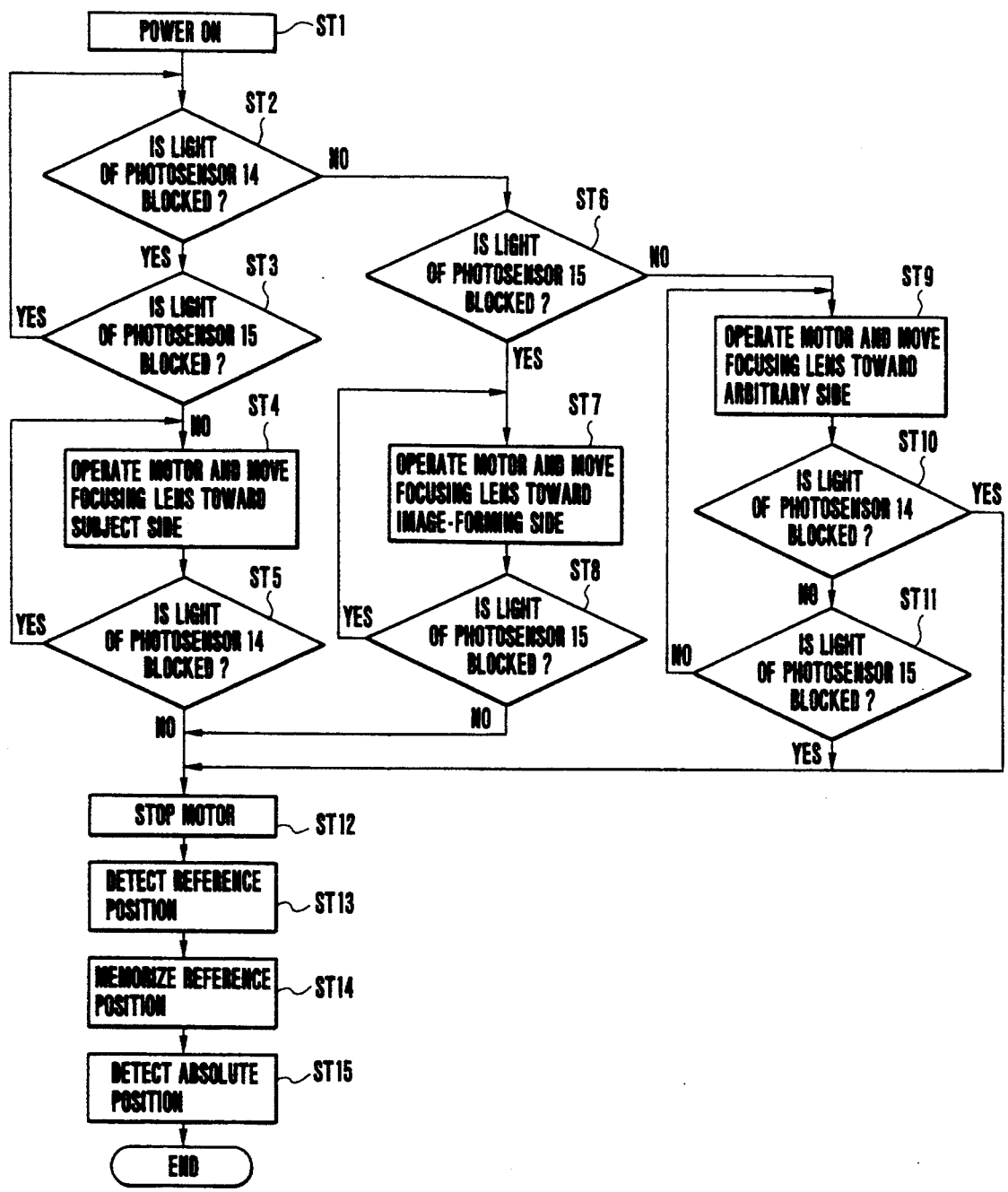
FIG. 4 is a flowchart showing a lens-position detecting operation according to the first embodiment.

FIG. 4 is a flowchart showing control executed by the microcomputer μ-com, and an operation for detecting the position of the focusing lens L1 will be described below with reference to the flowchart.

When the power source switch 17 of the present system is switched from its off state to its on state (ST1), the states of the respective photosensors 14 and 15 are checked (ST2, ST3, ST6). If the light of the photosensor 14 is blocked and the light of the photosensor 15 is not blocked, it is determined that the focusing lens L1 is located in the zone 3 shown in FIG. 2, and the stepping motor 12 is driven to move the focusing lens L1 toward a subject side along the optical axis (ST4). If it is determined that the focusing lens L1 has reached a switching point at which the photosensor 14 switches from its blocked state to its nonblocked state (ST5), the stepping motor 12 is stopped (ST12) and a reference position represented as an absolute position is detected from the position at which the focusing lens L1 is located at this time (ST13). If the light of the photosensor 15 is blocked and the light of the photosensor 14 is not blocked, it is determined that the focusing lens L1 is located in a zone 1, and the stepping motor 12 is driven in a direction opposite to the direction in which the stepping motor 12 was driven in Step ST4, thereby moving the focusing lens L1 toward an image-forming side along the optical axis (ST7). If it is determined that the focusing lens L1 has reached a switching point at which the photosensor 15 switches from the blocked state to the nonblocked state (ST8), the stepping motor 12 is likewise stopped (ST12) and another reference position is detected from the position at which the focusing lens L1 is located at this time (ST13). If neither of the light of the photosensors 14 and 15 is blocked, it is determined that the focusing lens L1 is located in a zone 2, and the stepping motor 12 is driven in an arbitrary direction, thereby moving the focusing lens L1 toward the image-forming or subject side along the optical axis (ST9). If it is determined that the focusing lens L1 has reached the switching point at which the photosensor 14 or 15 switches from the blocked state to the nonblocked state (ST10, ST11), the stepping motor 12 is stopped (ST12) and a reference position is detected from the position at which the focusing lens L1 is located at this time (ST13). If the reference position is detected, the state of detection of the reference position, that is, which of the positions of the photosensors 14 and 15 corresponds to the position where the reference position has been detected, is memorized. Subsequently, if the stepping motor 12 is driven on the basis of an output from the focus detecting device 18 for the purpose of a focusing operation, the absolute position of the focusing lens L1 is detected through a computation on the number of driving steps of the stepping motor 12 which are counted from the memorized reference position (ST15).

Figure 5:
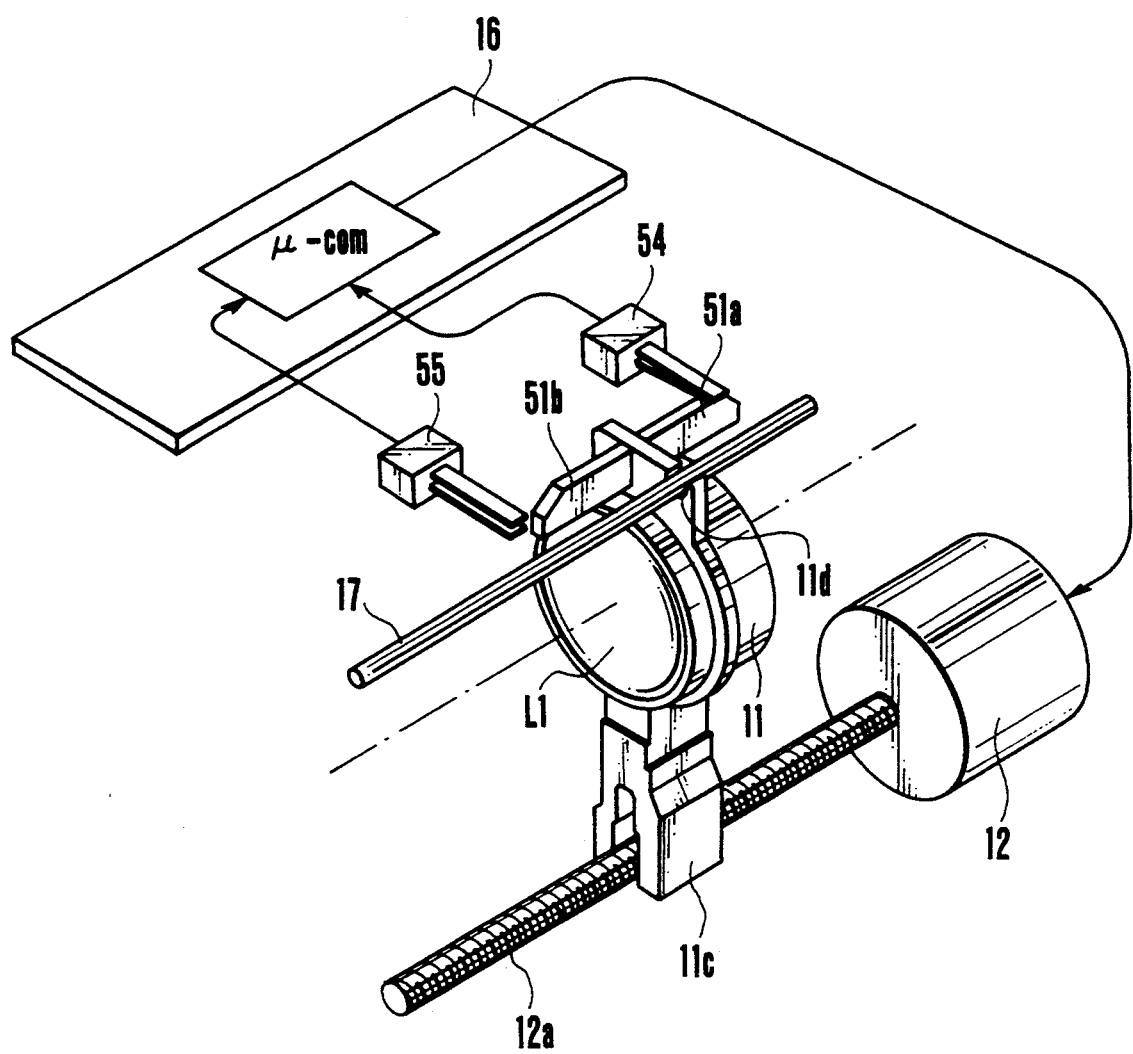
FIG. 5 is a schematic persecutive view of a lens moving mechanism according to a second embodiment of the present invention.

A second embodiment will be described below with reference to FIG. 5.

The second embodiment relates to another example of the above-described reference-position detecting arrangement, and all constituent elements except for those described above and an applicable operational flowchart are similar to those referred to in the above description of the first embodiment. Leaf switches 54 and 55 constitute part of the reference-position detecting arrangement. The leaf switch 54 or 55 is turned on or off by the movement of a corresponding one of projecting portions 51a and 51b which serve as operating members.

A third embodiment will be described below with reference to FIG. 6.

The third embodiment relates to another control flowchart for the microcomputer μ-com, and the arrangement of the third embodiment other than the control flowchart is similar to that referred to in the above description of the first embodiment.

Figure 6:
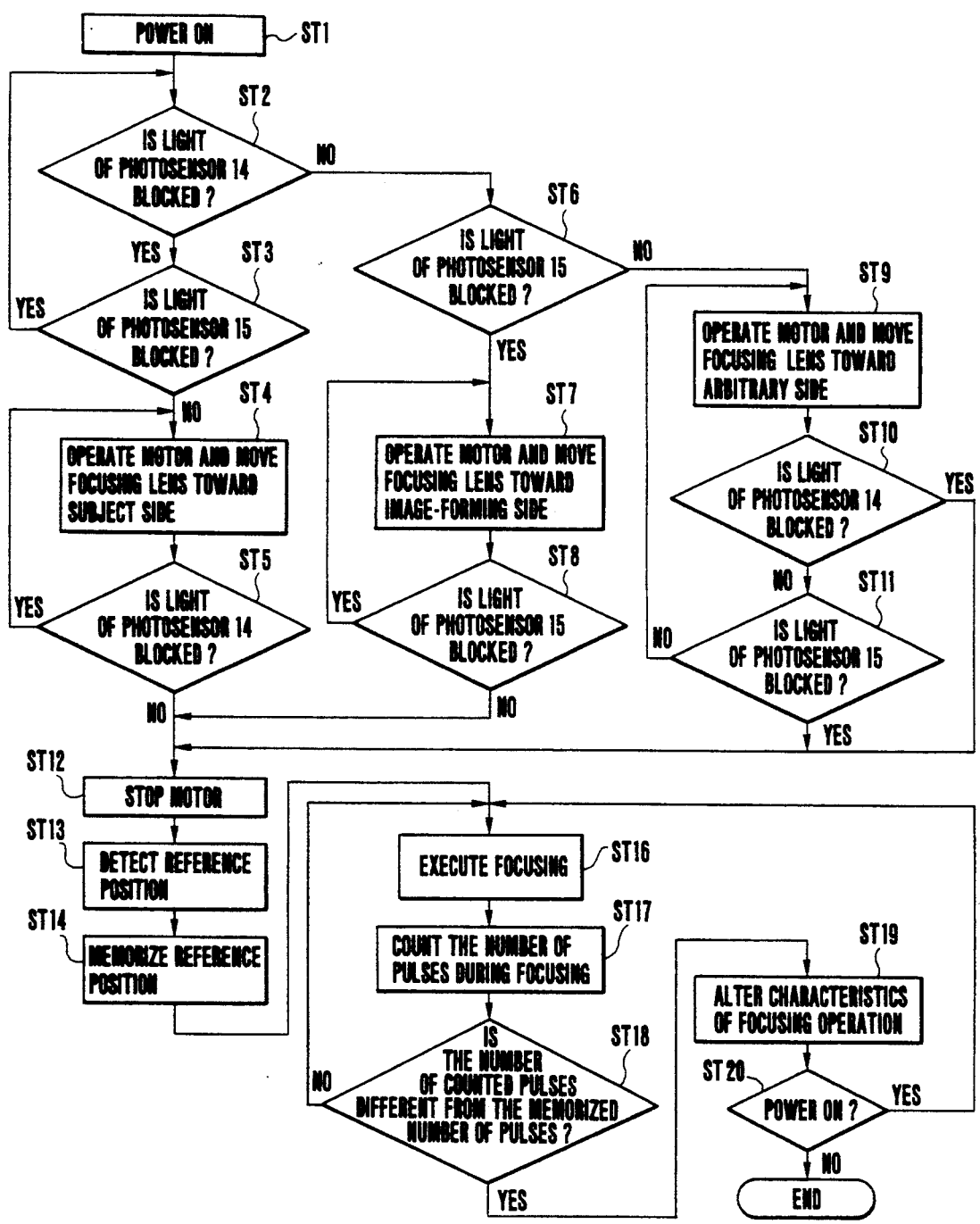
FIG. 6 is a flowchart showing a lens-position detecting operation according to a third embodiment.

Steps ST1 to ST14 in the flowchart of FIG. 6 are identical to those explained in connection with the first embodiment, and description thereof is omitted.

While the focusing operation of driving the stepping motor 12 for focusing purpose on the basis of the output of the focus detecting device 18 is being executed (ST16), the driving pulses of the stepping motor 12 are counted at all times (ST17). During this pulse counting, the number of driving pulses actually counted during a movement of the focusing lens L1 between two reference positions is compared with the memorized number of pulses (a value stored in a memory of the microcomputer μ-com). If they do not coincide with each other, the driving characteristics of the stepping motor 12 are varied (ST19). This variation of the driving characteristics is intended to optimumly improve the response characteristics of the stepping motor 12 relative to applied pulses. For example, a driving voltage for the stepping motor 12 may be increased or the period of occurrence of the driving steps may be made longer. As far as the power source switch 17 is not turned off (ST20), the focusing operation is continued.

A fourth embodiment will be described below with reference to FIG. 7.

The fourth embodiment relates to another control flowchart for the microcomputer μ-com, and the arrangement of the fourth embodiment other than the control flowchart is similar to that referred to in the above description of the first embodiment.

Figure 7:
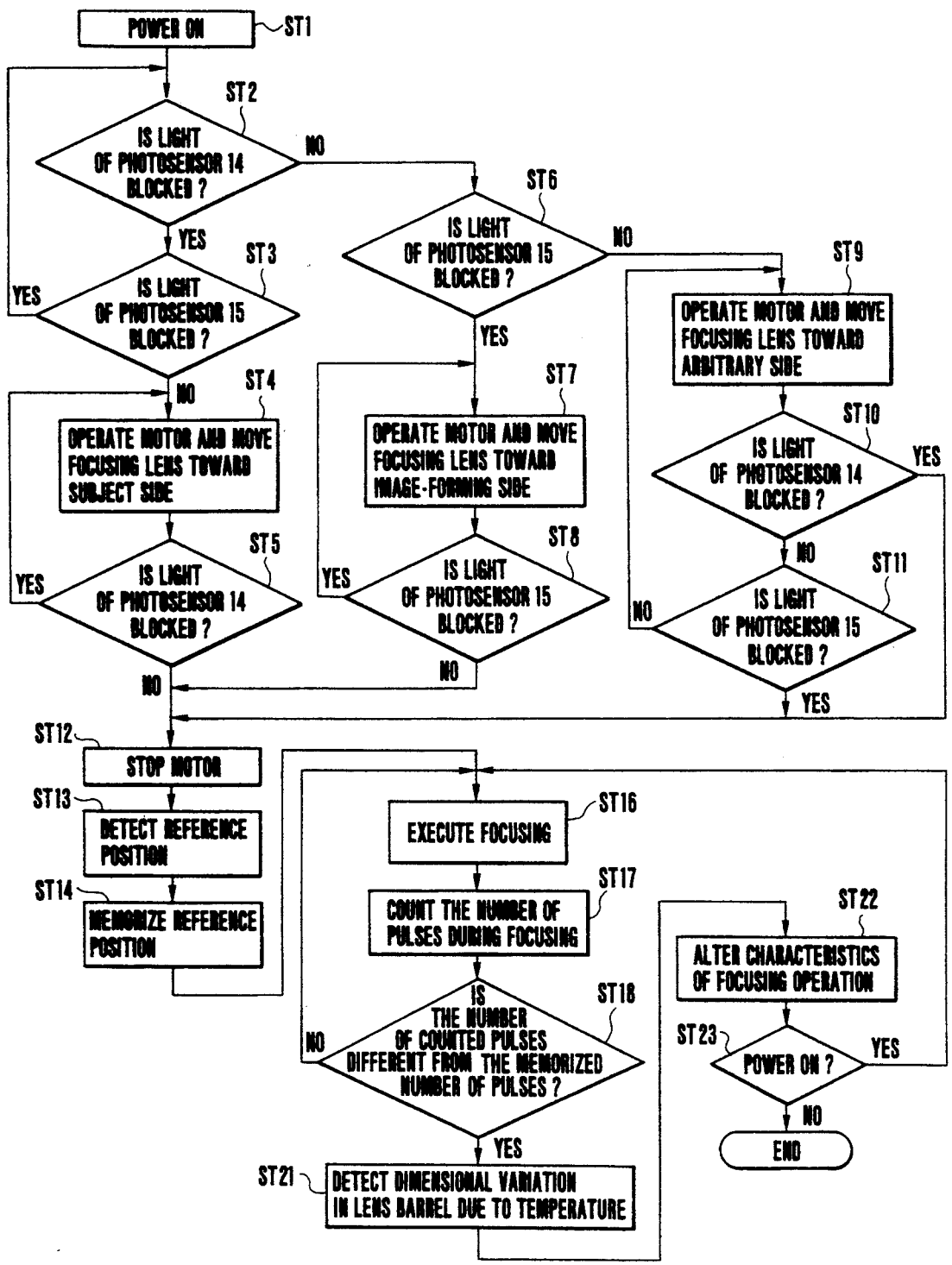
FIG. 7 is a flowchart showing a lens-position detecting operation according to a fourth embodiment.

Steps ST1 to ST14 in the flowchart of FIG. 7 are identical to those explained in connection with the first embodiment, and description thereof is omitted. Steps ST16 to ST18 in the flowchart of FIG. 7 are identical to those explained in connection with the third embodiment.

In the fourth embodiment, if the number of actually counted pulses does not coincide with the memorized number of pulses, it is determined that a dimensional variation has occurred in a lens-barrel part due to a temperature variation (ST21). In Step ST21, the difference between the number of actually counted pulses and the memorized number of pulses is memorized, and the driving characteristics of the stepping motor 12 are varied according to the memorized difference (ST22). This variation of the driving characteristics means that the number of driving pulses of the stepping motor 12 is corrected (increased or decreased) so that, even if a temperature variation occurs, it is possible to reach an in-focus state as fast as possible or it is possible to maintain an in-focus state if the apparatus is already in focus. Since the amount of this correction necessarily depends on temperature, the amount of the correction is determined on the basis of the memorized difference obtained in Step ST21. The above-described operation is continued as far as the power source switch 17 is not turned off (ST23).

Although the above description of each of the first to fourth embodiments has referred to the example in which the focusing lens is a moving lens, the variator lens may, of course, be selected as the moving lens. As the reference-position detecting mechanism, it is also possible to adopt a mechanism other than the mechanisms explained in connection with the respective embodiments described above. For example, a magnetic sensor may also be utilized. As a matter of course, it is also possible to practice various modifications of the arrangement of the reference-position detecting mechanism.

According to any of the first to fourth embodiments, detecting mechanisms for detecting individual reference positions of the moving lens are provided at a plurality of positions and the absolute position of the moving lens is detected on the basis of the number of driving steps of the stepping motor which are counted from each of the reference positions. Accordingly, it is possible to reduce the time required to detect the position of the moving lens. Accordingly, in a system arranged to perform a normal focusing operation after the moving lens is initially moved to its reference position when the power source is turned on, it is possible to reduce the start-up time of the system.

In addition, a value equivalent to the amount of movement of the moving lens between each reference position is memorized and the memorized value is compared with the actual number of driving steps of the stepping motor. If a difference results from the comparison, the driving characteristics of the stepping motor are varied. Accordingly, it is possible to reduce the operational error of the moving lens such as the deviation of focus.

Otherwise, a value equivalent to the amount of movement of the moving lens between each reference position is memorized and the memorized value is compared with the actual number of driving steps of the stepping motor. If a difference results from the comparison, it is determined that the dimension of a lens-barrel part has varied due to a temperature variation, and by varying the driving characteristics of the stepping motor, it is possible to achieve accurate movement of the moving lens.

Figure 13:
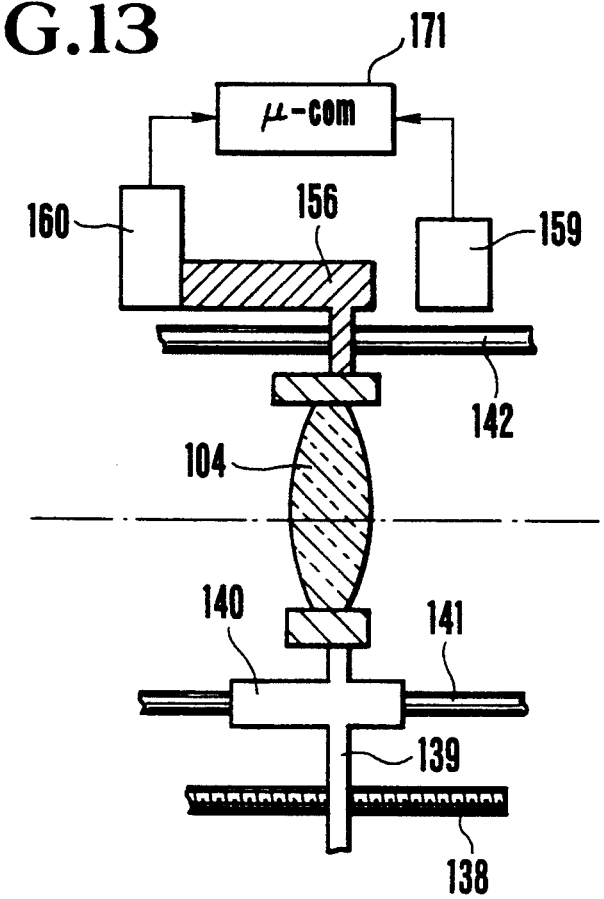
FIG. 13 is a schematic, side elevational view which serves to illustrate the arrangement of photointerrupters.
Figure 14:
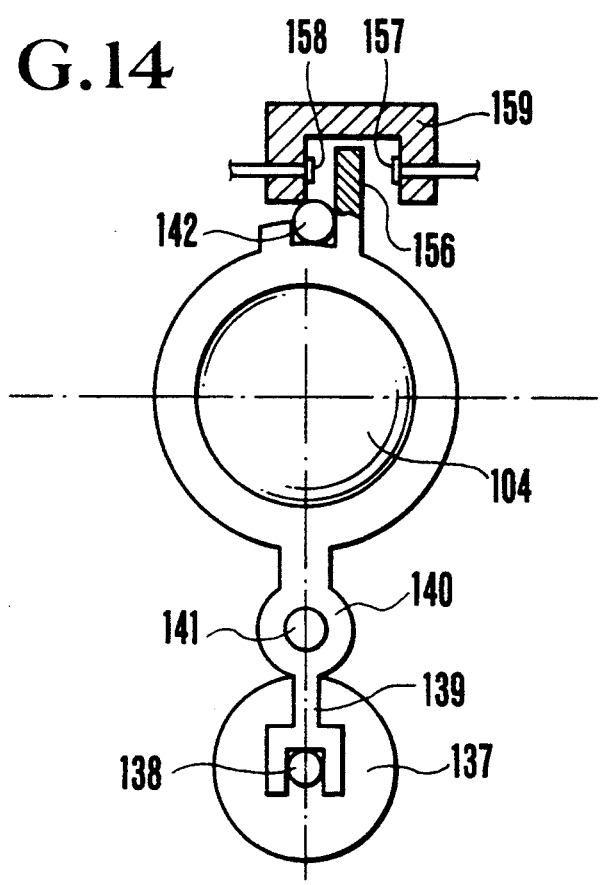
FIG. 14 is a front elevational view of FIG. 13.
Figure 15:
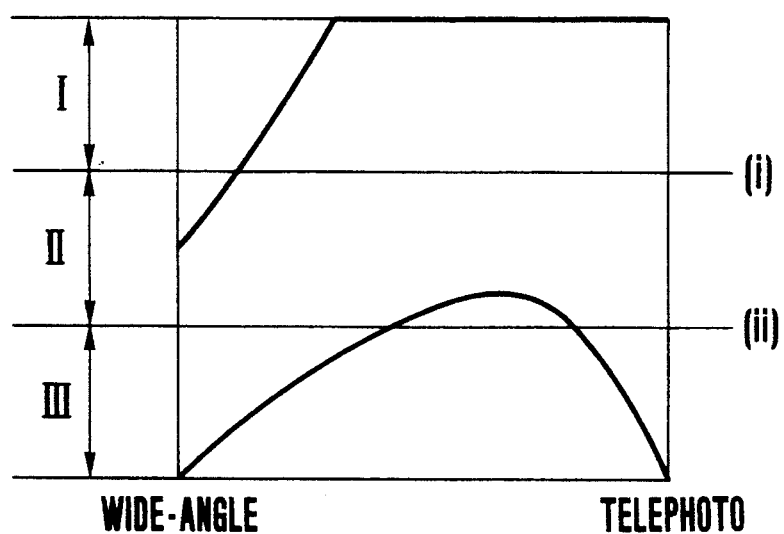
FIG. 15 is an explanatory view showing the moving range of the focusing lens which is divided into zones.

FIGS. 13 and 14 show an example which constitutes a premise of a fifth embodiment and in which two photointerrupters are provided for detecting reference positions of a lens. A light blocking part 156 associated with photointerrupters 159 and 160 is provided integrally with a movable frame 140. Each of the photointerrupters 159 and 160 has a light emitting element 158 and a light receiving element 157 which are opposed to each other. The entire range of movement of a focusing lens 104 is divided into three zones I, II and III as shown in FIG. 15. Two reference positions can be used, a boundary (i) between the zones I and II and a boundary (ii) between the zones II and III. As a matter of course, the shown example is arranged in the following manner to achieve a correct operation whichever of the boundary (i) and the boundary (ii) is used, that is, if it is assumed that "a" represents a count start address which is set when the focusing lens 104 is located at the boundary (i) and "b" represents a count start address which is set when the focusing lens 104 is located at the boundary (ii), the value of "a−b" coincides with the number of driving steps needed to move the focusing lens 104 between the boundaries (i) and (ii).

By adopting a code such as that shown in Table 2, it is possible to identify the zones I to III by means of the photointerrupters 159 and 160 shown in FIGS. 13 and 14. In Table 2, "1" indicates "blocked state" and "0" indicates "nonblocked state".

TABLE 2

|  | I | II | III |
|---|---|---|---|
| PHOTOINTERRUPTER 159 | 1 | 0 | 0 |
| PHOTOINTERRUPTER 160 | 0 | 0 | 1 |

One reference position suffices to achieve the object of detecting an absolute position. However, if the number of photointerrupters are increased up to two or more, it is possible to provide the advantage that it is possible to reduce the time required to complete a reference-position detecting operation immediately after the power source is turned on.

Table 3 shows which of the boundaries (i) and (ii) shown in FIG. 15 is selected as the reference position.

TABLE 3

| LENS POSITION | I | II | III |
|---|---|---|---|
| RESET POSITION | (i) | (i) or (ii) according to a result of AF | (ii) |

Although, in Table 3, the boundary (ii) is selected as a reset position when the focusing lens 104 is located in the zone II, the boundary (i) may also be selected. By adopting this setting, it is, of course, possible to reduce the time required for the focusing lens 104 to reach its reference position when compared to an arrangement using only one reference position.

In the example shown in FIGS. 13 and 14, a plurality of photointerrupters are provided to reduce the time required to complete a reset-position detecting operation. However, during this time, an AF operation is not performed, and the AF operation is started after the completion of the reset-position detecting operation. If it is difficult to detect the direction of the AF operation (near focus or far focus) with the focusing lens 104 located in the reset position (for example, if a subject is remarkably defocused), it takes a long time to bring the subject into focus. Accordingly, it cannot be said that the aforesaid example takes satisfactory care of reduction of the time taken until recording of an image is started or until recording of an image of satisfactory quality becomes possible after the start of the recording.

Figure 11:
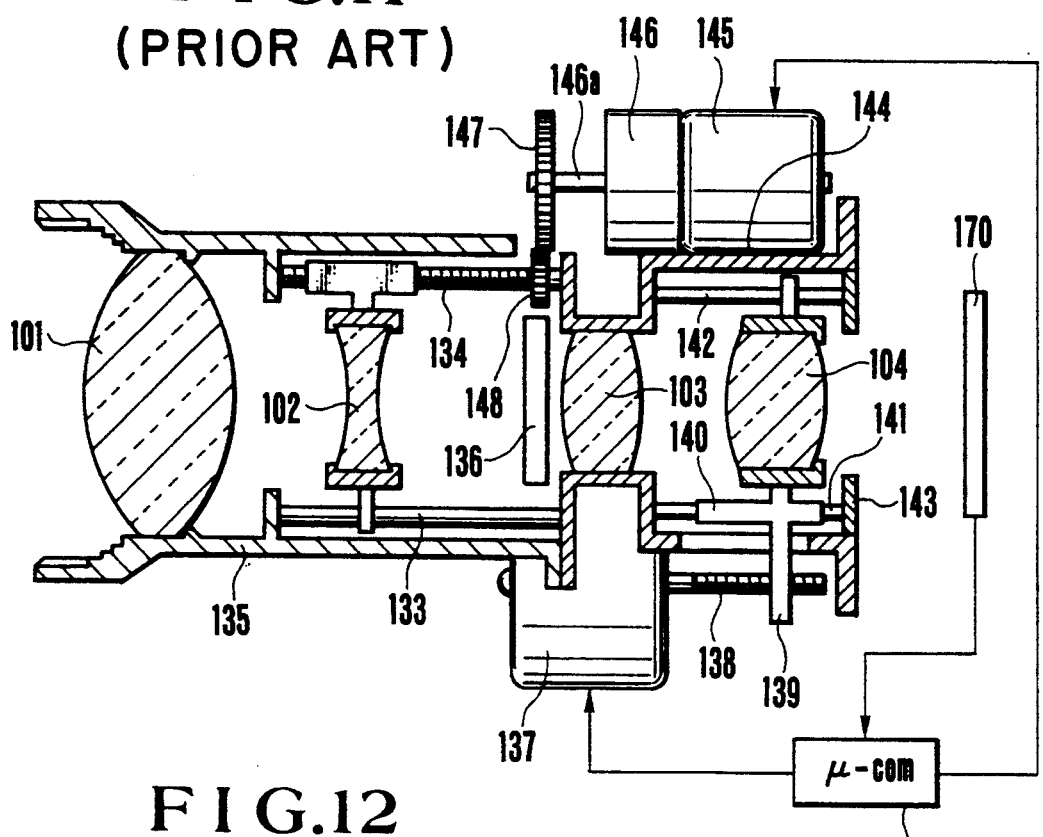
FIG. 11 is a vertical, sectional view diagrammatically showing a conventional optical apparatus.
Figure 12:
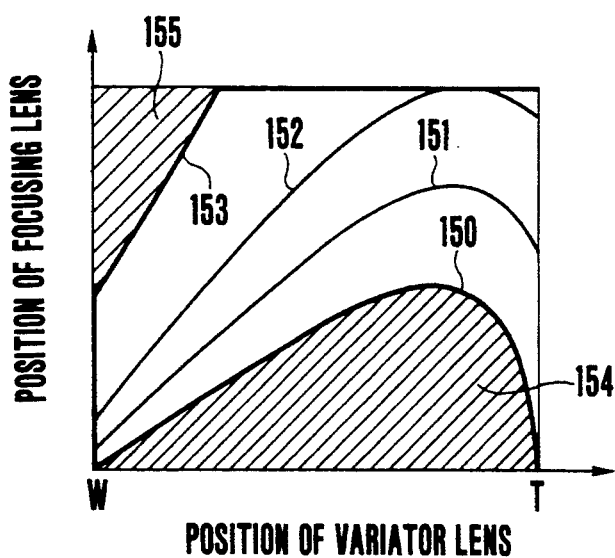
FIG. 12 is an explanatory view of a positional relation between a variator lens and a focusing lens.

Incidentally, a microcomputer 171 is similar to the microcomputer μ-com shown in FIG. 11, and is supplied with outputs from the respective photointerrupters 159 and 160.

The fifth embodiment is an improved version of the arrangement shown in FIGS. 13 and 14.

The fifth embodiment will be described below with reference to the associated drawings.

Table 4 shows which position is selected as the reference position when the power source is turned on with the focusing lens 104 located in each of the zones I to III shown in FIG. 15.

TABLE 4

| LENS POSITION | I | II | III |
|---|---|---|---|
| RESET POSITION | (i) I→II | (ii) II→III | (ii) III→II |

If the focusing 104 is located in the zone II, which of the boundaries (i) and (ii) is selected as the reference position is determined from the result of detection of the direction of AF (near focus or far focus).

If an in-focus position is to be detected by using a high-frequency component F of a Y signal, it is common practice to vibrate the focusing lens 104 in the direction of its optical axis to a small extent and detect the direction of focusing on the basis of the positional relation between the phase of vibration and the high-frequency component F.

Although reset positions relative to the respective zones I and III are identical to those explained in connection with FIGS. 13 and 14, the fifth embodiment is arranged so that the high-frequency component F is monitored even while the focusing lens 104 is being moved from either of the reset positions.

Figure 8:
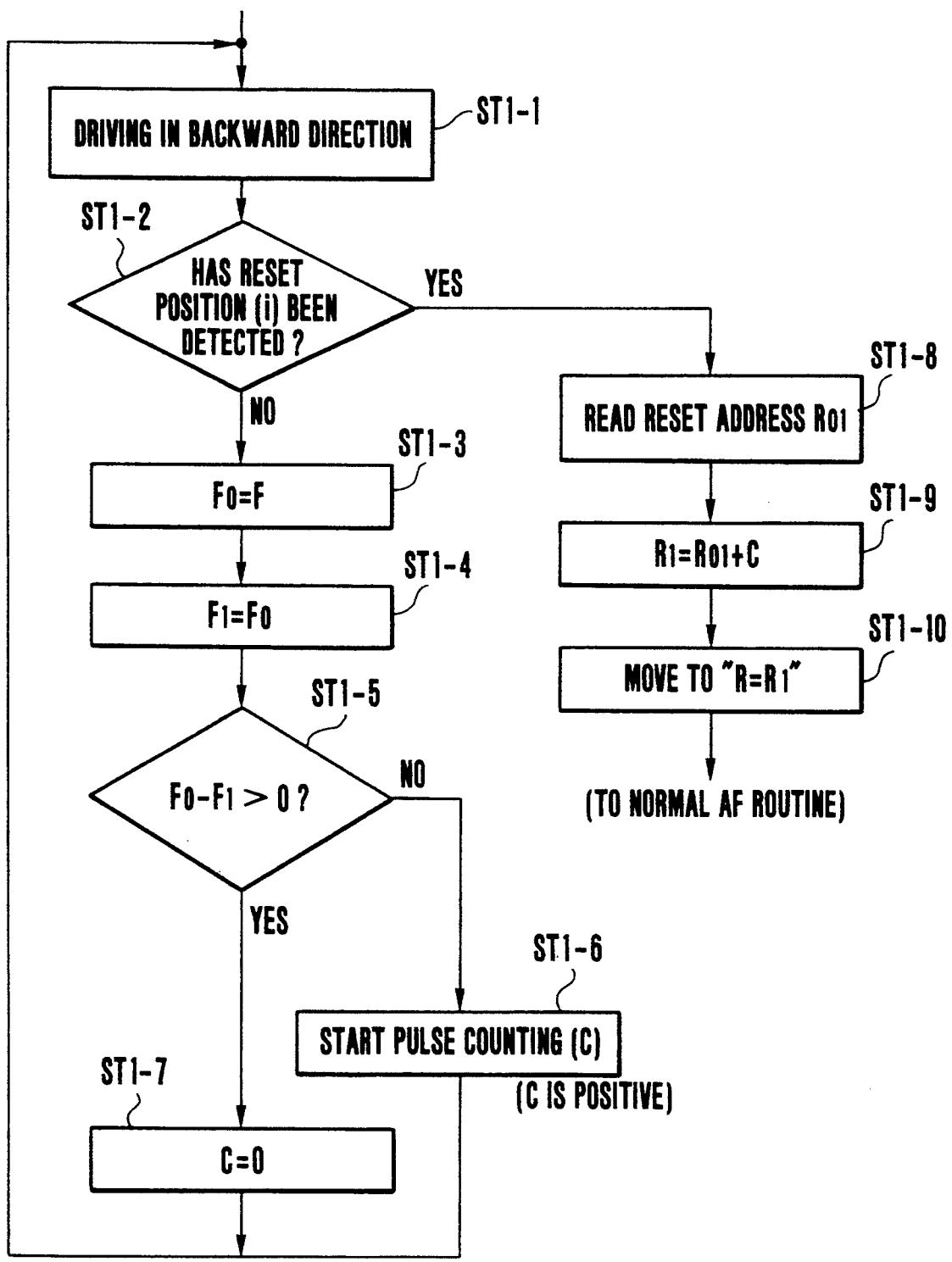
FIG. 8 is a flowchart showing an operation according to a fifth embodiment which is executed by an optical apparatus when a focusing lens is located in a zone I.

FIG. 8 is a flowchart for the microcomputer $\mu$-com and shows a resetting operation which is executed when the focusing lens 104 is located in the zone I. If it is assumed that the downward movement of the focusing lens 104 along the vertical axis in FIG. 15 is a backward movement, the focusing lens 104 is driven toward a backward side, i.e., in a resetting direction, in Step ST1-1. In Step ST1-2, it is determined whether the reset position (i) has been detected. If the reset position (i) has not yet been detected, the value of the current high-frequency component F is stored into a register $F_0$ in Step ST1-3, and the value of the register $F_0$ is stored into a register F1 in Step ST1-4.

Then, in Step ST1-5, it is determined whether the value of "$F_0-F_1$" is positive or negative. If the value is positive, since the value of the high-frequency component F increases, this indicates that the focusing lens 104 is moving in a focusing direction and in the resetting direction at the same time. In this case, in Step ST1-7, the value of a counter C is set to "C=0".

If it is determined that the value of "$F_0-F_1$" is negative, particularly if it is determined that the value has changed from positive to negative, this indicates that the position which the focusing lens 104 has just passed is an in-focus position. If it is determined in Step ST1-5 that the value is negative from the beginning, this indicates that an in-focus position has already been located closer to the backward side than a position where the focusing lens 104 is located at the time of the start of the resetting operation.

In any case, the position of the focusing lens 104 when "$F_0-F_1$" first becomes negative is set as "C=0", and the number of pulses (the number of pulses inputted to the stepping motor 137) is continuously counted from the start of the resetting operation at that position until the end of the resetting operation (ST1-6).

After the reset position has been detected, that is, if the result of the decision made in Step ST1-2 is "YES", a reset address $R_{01}$ which is the reference value (the reset address $R_{01}$ s determined in advance) is read (ST1-8). Subsequently, if the focusing lens 104 moves by n pulses in a forward direction, the resultant position is detected as ($R_{01}+n$), while the focusing lens 104 moves by n pulses in the backward direction, the resultant position is detected as ($R_{01}-n$). In this manner, the absolute positions of the focusing lens 104 are detected. In the aforesaid operation, the value of the counter C is counted as a positive value even during the backward movement of the focusing lens 104. In Step ST1-9, "$R_{01}+C$" is calculated as an address $R_1$.

Then, in Step ST1-10, the focusing lens 104 is forcedly moved so that an address R indicative of the current position of the focusing lens 104 is made equal to the address $R_1$. Thereafter, the process proceeds to a normal AF routine for the first time.

According to this flowchart, at the time when the process switches from the resetting operation to a normal AF operation, the focusing lens 104 is located in a position detected during the resetting operation, which position can be regarded as an in-focus position, or the normal AF operation can be started with the focusing lens 104 located at a position closer to the in-focus position than the reset position. Accordingly, when compared to the conventional apparatus, it is possible to reduce the time taken from the time when the power source is turned on to start the resetting operation until the time when the focusing operation is completed.

Figure 9:
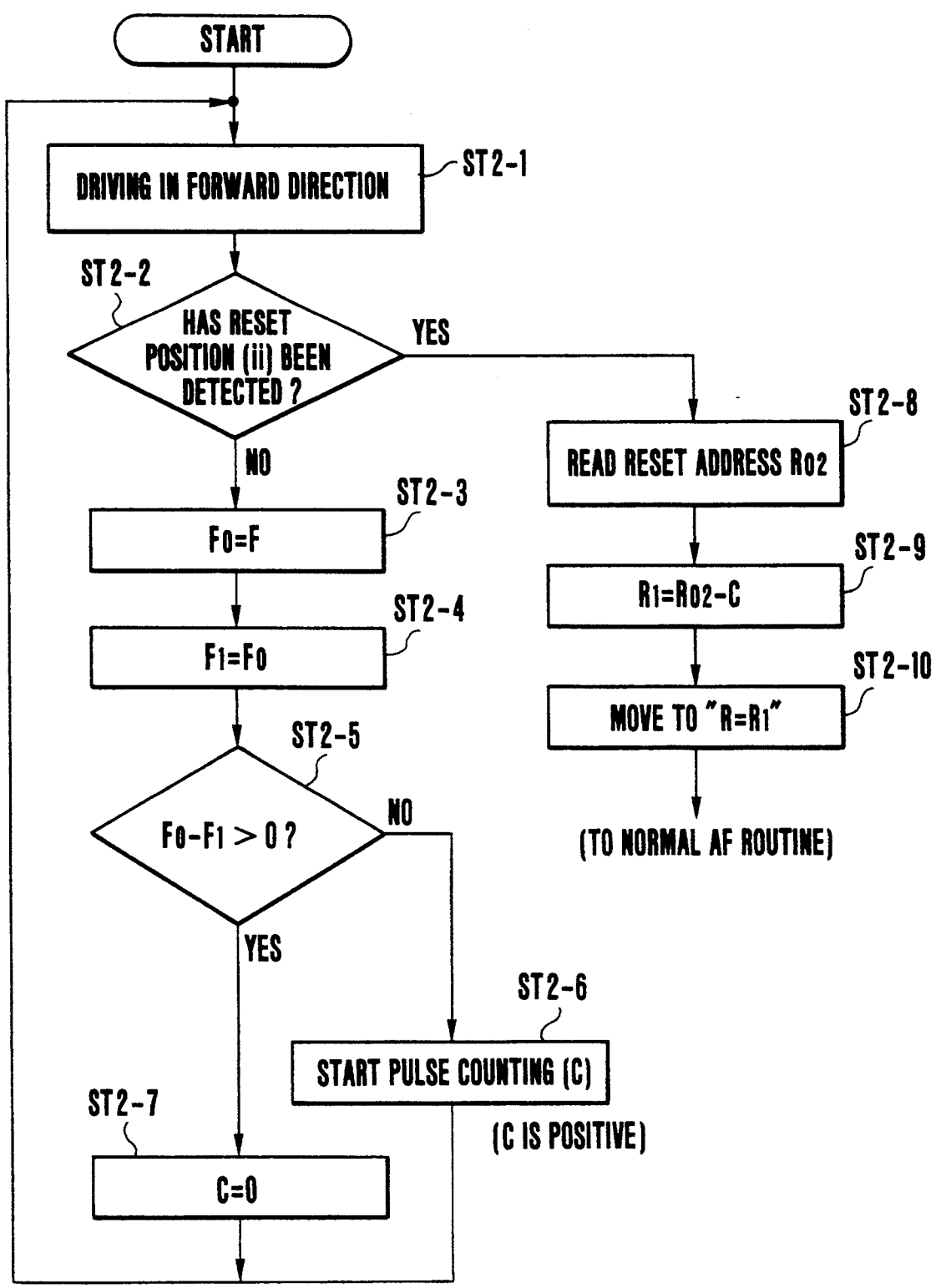
FIG. 9 is a flowchart showing an operation according to the fifth embodiment which is executed by the optical apparatus when the focusing lens is located in a zone III.

FIG. 9 is a flowchart showing a resetting operation which is executed when the focusing lens 104 is located in the zone III. The flowchart of FIG. 9 is basically identical to that of the resetting operation which is executed when the focusing lens 104 is located in the zone I, and the resetting operation of Steps ST2-1 to ST2-10 is executed.

Figure 10:
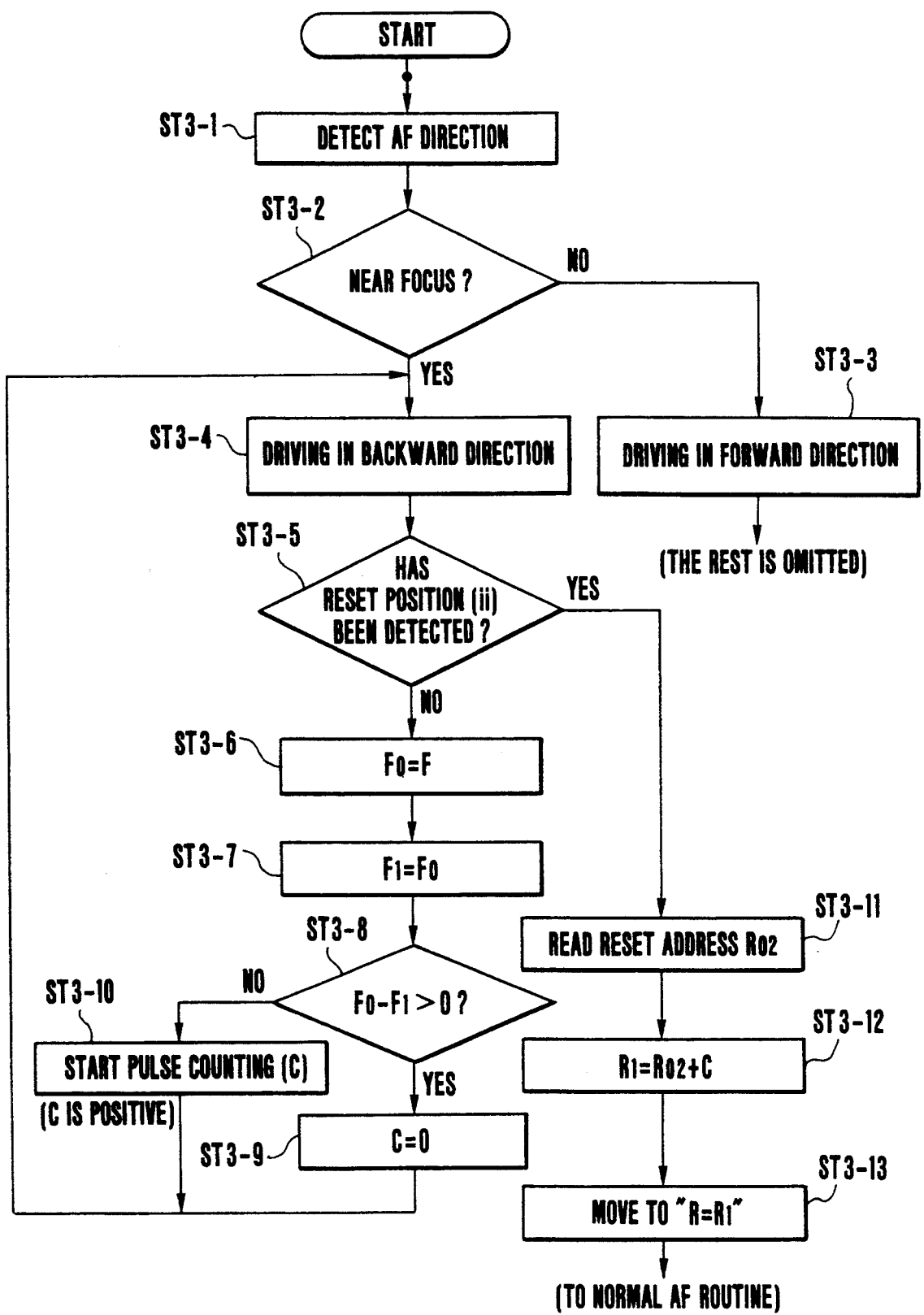
FIG. 10 is a flowchart showing an operation according to the fifth embodiment which is executed by the optical apparatus when the focusing lens is located in a zone II.

FIG. 10 is a flowchart showing a resetting operation which is executed when the focusing lens 104 is located in the zone II. Initially, in Step ST3-1, it is detected whether the state of focus is near focus or far focus, as by vibrating the focusing lens 104 to a small extent. In Step ST3-2, the process branches into two flows on the basis of the result of the detection. If the result of the detection is "NO", the focusing lens 104 is driven in the forward direction in Step ST3-3. If the result of the detection is "YES", that is, if the state of focus is near focus, an operation starting in Step ST3-4 is executed.

If the result of the detection in Step ST3-2 is near focus, since it is necessary to move the focusing lens 104 toward a side where an in-focus position is present, the focusing lens 104 is driven in the backward direction (ST3-4). Then, it is determined in Step ST3-5 that the reset position (ii) has been detected. If the reset position (ii) has not been detected, the difference between the value of the register $F_0$ and the value of the register $F_1$ is found in Steps ST3-6 to ST3-8 in a manner similar to that explained in connection with FIG. 8. If the difference is a positive value, the value of the counter C is set to "C=0". At a time when the value changes from positive to negative, pulse counting is started in Step ST3-10. After the focusing lens 104 has reached the reset position (ii), an operation similar to that explained in connection with FIG. 8 is executed in Steps ST3-11 to ST3-13.

In the above-described embodiment, two reference positions are provided, and it is determined which of the two reference positions is to be used, according to a detection result as to the AF direction. Even while the focusing lens is moving toward either of the reference positions, evaluation of AF is performed. In a system which is generally used in video cameras, i.e., in a system in which if a peak value of a high-frequency component of a Y signal is detected, then it is determined that the focusing lens is located in an in-focus position, the evaluation of AF indicates that measurement of "F" representative of the value of the high-frequency component of the Y signal is performed even while the focusing lens is moving for the purpose of detection of the reference position.

It is to be noted, therefore, that the fifth embodiment is practiced on the premise that the start-up operation of photography using a CCD or the like is sufficiently faster than the reference-position detecting operation. It is also to be noted that it is possible to adopt an arrangement similar to that of the fifth embodiment even if a single reference position is set, as in the case of the conventional arrangement.

As described above, according to the fifth embodiment, it is possible to provide the following features which can improve the operation of causing the focusing lens in the inner-focus type of zoom lens to move to the reference position.

(a) Account is taken into the result of detection as to the AF direction in determining the moving direction of the focusing lens.

(b) After the start of movement of the focusing lens, an AF evaluation signal (a high-frequency component of a Y signal) is measured, and if an in-focus position is present midway in a moving path of the focusing lens, the distance between the in-focus position and a reset position is found.

(c) In the case of (b), upon a resetting operation, after the focusing lens has been moved to an in-focus position at a high speed, a normal AF operation is started. Accordingly, it is possible to greatly reduce the time required to obtain an in-focus image after the power source is turned on.

What is claimed is:

1. An optical apparatus arranged to move a lens by using a stepping motor as a driving source, comprising:
a detection mechanism for detecting a plurality of reference positions of said lens, respectively;
a control circuit which moves said lens toward a reference position selected from said plurality of reference positions and causes said detection mechanism to detect said selected reference position of said lens, said control circuit also determining a moving direction of said lens, and
position detecting means for finding an absolute position of said lens on the basis of the number of driving steps of said stepping motor relative to said selected reference position.

2. An optical apparatus according to claim 1, further comprising comparing means for memorizing a value equivalent to the amount of movement of said lens between said plurality of reference positions and making a comparison between said memorized value and the number of driving steps of said stepping motor counted between said plurality of reference positions.

3. An optical apparatus according to claim 2, further comprising controlling means for controlling an operation of said stepping motor on the basis of a result of the comparison made by said comparing means.

4. An optical apparatus according to claim 1, wherein said lens performs focusing by moving.

5. An optical apparatus according to claim 1, wherein a feed screw is rotated by a rotation of said stepping motor, a rack is moved along an optical axis by said feed screw being rotated, and said lens is moved along the optical axis by said rack being moved.

6. An optical apparatus according to claim 1, wherein said detecting mechanism is capable of detecting a plurality of zones so as to detect said plurality of reference positions by detecting a switching point where the zone in which said lens is positioned changes due to the movement of said lens, and said control circuit determines the moving direction of said lens in response to the zone detected by said detecting mechanism where said lens is positioned.

7. An optical apparatus according to claim 4, wherein said detecting mechanism is capable of detecting a plurality of zones so as to detect said plurality of reference positions by detecting a switching point where the zone in which said lens is positioned changes due to the movement of said lens, and said control circuit determines the moving direction of said lens in response to the zone detected by said detecting mechanism where said lens is positioned.

8. An optical apparatus according to claim 5, wherein said detecting mechanism is capable of detecting a plurality of zones so as to detect said plurality of reference positions by detecting a switching point where the zone in which said lens is positioned changes due to the movement of said lens, and said control circuit determines the moving direction of said lens in response to the zone detected by said detecting mechanism where said lens is positioned.

9. An optical apparatus according to claim 1, further comprising a memorizing circuit for forcedly driving said stepping motor in response to an on-operation of a power source, detecting said plurality of reference positions by means of said detecting disposed at said plurality of positions, and memorizing said reference positions.

10. An optical apparatus according to claim 9, wherein a microcomputer is used as said memorizing circuit.

11. An optical apparatus according to claim 4, further comprising:
a focus detecting device for detecting a state of focus of said lens; and
a driving circuit for driving said stepping motor on the basis of an output of said focus detecting device.

12. An optical apparatus comprising:
a lens;
driving means for moving said lens;
reference-position detecting means for detecting a reference position of said lens, said reference-position detecting means causing said driving means to operate to move said lens for the purpose of detecting said reference position;
focus detecting means; and
a control circuit for causing said focus detecting means to operate while said reference-position detecting means is detecting said reference position.

13. An optical apparatus according to claim 12, wherein a focusing lens is used as said lens.

14. An optical apparatus according to claim 12, wherein said driving means uses a stepping motor as a driving source.

15. An optical apparatus according to claim 14, further comprising lens-position detecting means for finding an absolute position of said lens from the number of driving steps of said stepping motor counted from said reference position.

16. An optical apparatus according to claim 14, wherein a plurality of reference positions are set for said reference-position detecting means, said reference-position detecting means detecting said reference position from a movement of said lens in the direction of an in-focus position thereof on the basis of an output of said focus detecting means.

17. An optical apparatus according to claim 16, further comprising lens-position detecting means for finding an absolute position of said lens from the number of driving steps of said stepping motor counted from said reference position.

18. An optical apparatus arranged to move a lens by using a motor as a driving source, comprising:
- a detecting mechanism for detecting a plurality of reference positions of said lens, respectively,
- a control circuit which moves said lens toward a reference position selected from said plurality of reference positions and causes said detection mechanism to detect said selected reference position of said lens, said control circuit also determining a moving direction of said lens,
- a detecting circuit for detecting the amount of movement of said lens, and
- position detecting means for finding an absolute position of said lens on the basis of the amount of movement of said lens relative to said selected reference position.

19. An optical apparatus according to claim 18, further comprising comparing means for memorizing a value equivalent to the amount of movement of said lens between said plurality of reference positions and making a comparison between said memorized value and the number of driving steps of said stepping motor counted between said plurality of reference positions.

20. An optical apparatus according to claim 19, further comprising controlling means for controlling an operation of said stepping motor on the basis of a result of the comparison made by said comparing means.

21. An optical apparatus according to claim 18, wherein said lens performs focusing by moving.

22. An optical apparatus according to claim 18, wherein said detecting mechanism is capable of detecting a plurality of zones so as to detect said plurality of reference positions by detecting a switching point where the zone in which said lens is positioned changes due to the movement of said lens, and said control circuit determines the moving direction of said lens in response to the zone detected by said detecting mechanism where said lens is positioned.

23. An optical apparatus according to claim 18, further comprising a memorizing circuit for forcedly driving said motor in response to an on-operation of a power source, detecting said plurality of reference positions by means of said detecting mechanism disposed at said plurality of positions, and memorizing said reference positions.

24. An optical apparatus according to claim 21, further comprising:
- a focus detecting device for detecting a state of focus of said lens; and
- a driving circuit for driving said motor on the basis of an output of said focus detecting device.

* * * * *

UNITED STATES PATENT AND TRADEMARK OFFICE
CERTIFICATE OF CORRECTION

PATENT NO. : 5,345,290
DATED : September 6, 1994
INVENTOR(S) : Takashi Watanabe et al.

It is certified that error appears in the above-identified patent and that said Letters Patent is hereby corrected as shown below:

Col. 3, line 38.  Change "solve" to -- solving --.

Col. 5, line 42.  Change "(STS)" to -- (ST8) --.

Col. 6, line 36.  Change " optimumly " to -- optimally --.

Col. 12, line 33.  After "detecting" insert -- mechanisms --.

Signed and Sealed this

Thirteenth Day of December, 1994

Attest:

BRUCE LEHMAN

*Attesting Officer*      *Commissioner of Patents and Trademarks*